United States Patent Office 3,282,832
Patented Nov. 1, 1966

3,282,832
PRODUCTION OF KETONES, ACIDS AND
ESTERS FROM OLEFINES
Donald Holroyde Hey, Tadworth, and John Ivan George Cadogan, Southborough, Tunbridge Wells, England, assignors to The Distillers Company Limited, Edinburgh, Scotland, a British company
No Drawing. Filed Mar. 3, 1961, Ser. No. 93,016
Claims priority, application Great Britain, Mar. 11, 1960, 8,583/60
6 Claims. (Cl. 204—162)

This invention relates to a process for producing chemical compounds of value as intermediates in organic syntheses, etc., which process is particularly useful in the production of ketones, acids, esters, and nitriles.

Compounds such as acetylacetone, acetoacetic ester and malonic ester are well known as starting materials for organic synthesis, and we have now found that it is possible to prepare derivatives of these and other compounds containing activated methylene groups, which may be useful in themselves or for synthetic purposes, by reaction with an ethylenically unsaturated compound.

According to the present invention a process for preparing a derivative of a compound containing an activated methylene group or substituted methylene group by replacing a hydrogen atom in such a group with a hydrocarbon grouping, comprises heating an unsaturated compound having the formula

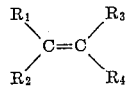

wherein $R_1$, $R_2$, $R_3$ and $R_4$ are alkyl, aryl or alkaryl groups, or such groups containing indifferent substituents, or hydrogen, with a compound containing a methylene group or substituted methylene group which is activated by at least two adjacent groups capable of such activation, in the presence of an initiator for free radical formation.

The methylene groups or substituted methylene groups referred to may be of the form

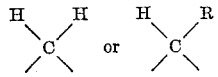

where R may be an alkyl, aryl, alkaryl, etc., group, or may be an activating group as referred to above.

Particularly suitable ethylenically unsaturated compounds are those of the general formula

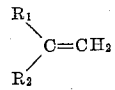

wherein $R_1$ and $R_2$ are alkyl, aryl or alkaryl groups, or such groups containing indifferent substituents, or hydrogen, for example 1-olefins and related compounds. It will be understood, however, that other unsaturated compounds may be employed, including other olefins, diolefins and cyclo-olefines. When diolefines are used one or both of the double bonds may react. Certain unsaturated substances, for example styrene and related compounds which are very readily polymerizable, may not be suitable for use in the process of the present invention under all conditions.

Suitable compounds containing reactive methylene groups include those in which a methylene group is adjacent to two activating groups such as CN, CO, $NO_2$, COOAlk, COOH, $CONH_2$, etc., for example esters of malonic and acetoacetic acids, α-cyano-esters, β-diketones, etc. Certain such compounds may, however, be suitable for use in the process, under all conditions, due to a tendency to polymer formation.

The reactants are preferably mixed in proportions of 1 mole of the unsaturated compound to about at least 4 moles of the compound containing a methylene group activated in the above mentioned manner and heated in the presence of the free radical initiator or exposed to ultra-violet light, ionising radiation, etc. In some cases proportions of 1 mole of the unsaturated compound to 20 or more moles of the compound containing the activated methylene group may be desirable.

By variation of the proportions of the unsaturated compound and of the compound containing the activated methylene group, it is possible to obtain adducts consisting of more than one molecule of the unsaturated compound per molecule of the compound containing the activated methylene group.

In the process of this invention any suitable catalytic agent capable of initiating free radical formation may be employed, such as, for example, organic peroxides, persalts, certain azo-compounds, ultra-violet light, ionising radiation, and activated metals.

Example 1

Octene-1 was heated for thirty-six hours with ethyl malonate at a temperature of 105° C., in proportions of 1 mole of olefine to 5 mols of ester, in the presence of tertiary butyl peroxide (0.1 mole) as initiator. On removal of the excess of ester by distillation the residue was found to contain ethyl n-octyl-malonate. Hydrolysis of this ester gave n-octylmalonic acid M.P. 113–114° C.

Example 2

Octene-1 was heated for thirty-six hours with ethyl acetoacetate at a temperature of 105° C., in proportions of 1 mole of olefine to 4 moles of ester, in the presence of tertiary butyl peroxide (0.1 mole) or benzoyl peroxide (0.1 mole). On removal of the excess of ester by distillation the residue was found to contain ethyl α-octylacetoacetate, which on hydrolysis gave methyl n-nonyl ketone M.P. 10° (semicarbazone M.P. 121°).

Example 3

Octene-1 was heated for twenty-four hours with ethyl cyanoacetate at a temperature of 105° C., in proportions of 1 mole of olefine to 5 moles of ester, in the presence of tertiary butyl peroxide (0.1 mole). After removal of the excess of ester by distillation the residue was found to contain ethyl n-octylcyanoacetate, which on hydrolysis gave n-octyl-malonic acid M.P. 114°.

Example 4

Octene-1 was heated for 4 days with diethyl malonate at a temperature of 105° C. in proportions of 1 mole olefin to 30 moles of ester in the presence of tertiary butyl peroxide (0.05 mole) as initiator. Distillation gave diethyl n-octyl-malonate in 79% yield together with the 2:1 adduct in 5% yield. Hydrolysis of this ester gave n-octyl-malonic acid M.P. 113–114° C.

Example 5

Cyclohexene was heated for 60 hours with diethyl malonate at a temperature of 105° C. in proportions of 1 mole of olefin to 5 moles of ester in the presence of benzoyl peroxide (0.1 mole) as initiator. On removal of the excess of ester by distillation the residue was found to contain diethyl cyclohexylmalonate and an unsaturated compound which was probably dicyclohexenyl. Hydrolysis of this ester gave cyclohexylmalonic acid M.P. 183.5–184° C.

Example 6

Octene-1 was irradiated with ultra-violet light in the presence of diethyl malonate at room temperature for 45 hours in proportions of 1 mole of olefin to 5 moles of ester. Distillation gave diethyl n-octylmalonate.

*Example 7*

Decene-1 was heated for 20 hours with diethyl malonate at a temperature of 105° C. in proportions of 1 mole of olefin to 4 moles of ester in the presence of benzoyl peroxide (0.1 mole) as initiator. On removal of the excess of ester by distillation the residue was found to contain diethyl n-decylmalonate (B.P. 106–112°/0.05 mm.), which on hydrolysis gave n-decylmalonic acid M.P. and mixed M.P. 118–119.5°.

*Example 8*

Octene-2 was heated for 4 days with diethyl malonate at a temperature of 105° C. in proportions of 1 mole of olefin to 5 moles of ester, in the presence of tertiary butyl peroxide (0.15 mole). Distillation gave the 1:1-adduct of octene-2 with diethyl malonate, B.P. 75–85/0.04 mm., and the 2:1-adduct of octene-2 with diethyl malonate, B.P. 100–120°/0.04 mm. The 1:1-adduct is defined as the product of addition of one equivalent of diethyl malonate to one of octene-2. The 2:1-adduct is defined as the product formed from one equivalent of diethyl malonate and two equivalents of octene-2.

*Example 9*

Octene-1 was heated with diethyl ethylmalonate at a temperature of 105° C. for 4 days in the proportion of 1 mole of olefin to 4.7 moles of ester, in the presence of tertiary butyl peroxide (0.2 mole). Distillation gave (a) diethyl n-octyl-ethylmalonate in 32% yield, B.P. 107–112°/0.04 mm., which on hydrolysis gave n-octyl-ethylmalonic acid, M.P. and mixed M.P. 80–82°, and (b) the 2:1-adduct of octene-1 (2 moles) and diethyl ethylmalonate (1 mole), B.P. 148–154°/0.05 mm. in low yield.

*Example 10*

Octene-1 was heated for 4 days with acetylacetone at a temperature of 105° C. in proportions of 1 mole of olefin to 3.6 moles of ketone in the presence of tertiary butyl peroxide (0.2 mole) as initiator. Distillation gave (a) diacetyl-n-octylmethane in 25% yield, B.P. 70°/0.05 mm., which gave a copper salt M.P. 123.5–124°, and (b) the 2:1-adduct comprising 2 moles octene-1 and 1 mole acetylacetone, B.P. 140–142°/0.03 mm.

*Example 11*

Octene-1 was heated with ethyl cyanoacetate for 4 days at 105° C. in proportions of 1 mole of olefin to 20 moles of ester in the presence of tertiary butyl peroxide (0.15 mole) as initiator. Distillation gave ethyl n-octyl-cyanoacetate, B.P. 154–158°/15 mm. in 67% yield, which on hydrolysis gave n-octylmalonic acid, M.P. 113.5–114°.

*Example 12*

Octene-1 was heated with diethyl malonate at a temperature of 80° C. for 60 hours in the proportions of 1 mole of olefin to 20 moles of ester in the presence of benzoyl peroxide (0.05 mole) as initiator. Distillation gave diethyl n-octylmalonate in 67% yield.

*Example 13*

Octene-1 was heated with acetylacetone for 4 days at 105° C. in proportions of 1 mole of olefin to 20 moles of ketone, in the presence of tertiary butyl peroxide (0.05 mole) as initiator. Distillation gave diacetyl-n-octylmethane in 66% yield, and the 2:1 adduct in 10% yield.

*Example 14*

Octene-1 was heated with ethyl acetoacetate for 4 days at 105° C. in proportions of 1 mole olefin to 20 moles of ester in the presence of tertiary butyl peroxide (0.05 mole) as initiator. Distillation gave ethyl α-octyl acetoacetate in 61% yield, and the 2:1 adduct in 5% yield.

We claim:

1. A process for the production of a chemical compound selected from the group consisting of ketones, acids and esters which comprises heating an olefine selected from the group consisting of octene-1, octene-2, cyclohexene and decene-1 with a compound selected from the group consisting of diethyl malonate, ethyl acetoacetate and acetyl acetone in the presence of an initiator for free radical formation for 20 to 96 hours.

2. A process according to claim 1, in which the free radical initiator is ultraviolet light.

3. A process according to claim 1, in which the free radical initiator is ionizing radiation.

4. A process according to claim 1, in which the free radical initiator is tertiary butyl peroxide.

5. A process according to claim 1, in which the free radical initiator is benzoyl peroxide.

6. A process for the production of a chemical compound selected from the group consisting of ketones, acids and esters which comprises heating at a temperature in the range of about room temperature to 105° C. an olefine selected from the group consisting of octene-1, octene-2, cyclohexene and decene-1 with a compound selected from the group consisting of diethyl malonate, ethyl acetoacetate, and acetyl acetone in the presence of an initiator for free radical formation for 20 to 96 hours.

References Cited by the Examiner

UNITED STATES PATENTS 2,577,422  12/1951  Ladd _____ 260—485 X

OTHER REFERENCES

Houben-Weyl: "Methoden Der Organischen Chemie," vol. 8, 1952, pages 590–610.

Kharasch et al.: J.A.C.S., 70, pp. 1055–1059, 1948.

Migrdichian: "Organic Synthesis," vol. 2, 1957, pages 889–890.

Wagner et al.: "Synthetic Organic Chemistry," 1953, page 492.

CHARLES B. PARKER, *Primary Examiner.*

J. P. BRUST, *Assistant Examiner.*